United States Patent
Bergman et al.

(10) Patent No.: US 8,891,250 B2
(45) Date of Patent: Nov. 18, 2014

(54) AUDIO DEVICE WITH INTEGRATED SWITCHING POWER SUPPLY

(75) Inventors: John Bergman, River Falls, WI (US); Bryan Peterson, Balsam Lake, WI (US); Joshua Gathje, Woodbury, MN (US)

(73) Assignee: Cue, Inc., Woburn, MA (US)

( * ) Notice: Subject to any disclaimer, the term of this patent is extended or adjusted under 35 U.S.C. 154(b) by 925 days.

(21) Appl. No.: 12/346,947

(22) Filed: Dec. 31, 2008

(65) Prior Publication Data

US 2009/0225528 A1    Sep. 10, 2009

Related U.S. Application Data

(60) Provisional application No. 61/018,991, filed on Jan. 4, 2008.

(51) Int. Cl.
*H04B 1/03*     (2006.01)
*H04B 15/00*    (2006.01)

(52) U.S. Cl.
CPC .................................. *H04B 15/005* (2013.01)
USPC ........................................................ 361/814

(58) Field of Classification Search
USPC ................................. 361/814, 823
See application file for complete search history.

(56) References Cited

U.S. PATENT DOCUMENTS

| | | | |
|---|---|---|---|
| 4,583,865 A | 4/1986 | Kirk et al. | |
| 4,902,964 A | 2/1990 | Szabela et al. | |
| 5,424,514 A | 6/1995 | Lee | |
| 6,324,075 B1 * | 11/2001 | Unrein et al. | 361/816 |
| 6,973,153 B1 * | 12/2005 | McLellan | 375/377 |
| 7,323,855 B2 * | 1/2008 | Xiao et al. | 323/283 |
| 7,715,578 B2 * | 5/2010 | Zhu et al. | 381/317 |
| 2002/0102952 A1 * | 8/2002 | Leizerovich | 455/126 |
| 2003/0016003 A1 | 1/2003 | Tsai | |
| 2003/0184289 A1 | 10/2003 | Butters et al. | |
| 2006/0006839 A1 * | 1/2006 | Smith | 320/114 |
| 2006/0126363 A1 * | 6/2006 | Booth | 363/15 |
| 2006/0209637 A1 | 9/2006 | May et al. | |
| 2008/0045138 A1 * | 2/2008 | Milic-Frayling et al. | 455/3.04 |
| 2008/0153556 A1 * | 6/2008 | Oh | 455/570 |
| 2009/0224810 A1 | 9/2009 | Bergman et al. | |

FOREIGN PATENT DOCUMENTS

| | | | |
|---|---|---|---|
| JP | 2001-196949 A | 7/2001 | |
| JP | 2004-351968 A | 12/2004 | |
| JP | 2007-166165 A | 6/2007 | |
| JP | 2007-259250 A | 10/2007 | |
| WO | 99-65135 A1 | 12/1999 | |

\* cited by examiner

*Primary Examiner* — Tremesha S Willis
(74) *Attorney, Agent, or Firm* — Lando & Anastasi, LLP

(57) ABSTRACT

An integrated audio device, such as, for example, a table-top radio, including a housing, a speaker disposed within the housing, a switching power supply disposed within the housing, and audio circuitry disposed within the housing and coupled between the digital switching power supply and the speaker.

16 Claims, 3 Drawing Sheets

AUDIO DEVICE WITH INTEGRATED SWITCHING POWER SUPPLY

CROSS REFERENCE TO RELATED APPLICATIONS

This application claims priority under 35 U.S.C. §119(e) to U.S. Provisional Patent Application No. 61/018,991 entitled "AUDIO DEVICE WITH INTEGRATED SWITCHING POWER SUPPLY" and filed on Jan. 4, 2008, which is incorporated herein by reference in its entirety.

BACKGROUND

1. Field of Invention

The present invention relates generally to power supplies for electronic devices and, more particularly, to electronic devices with integrated power supplies.

2. Discussion of Related Art

Compact "table top" radios and other audio devices (e.g., CD and/or MP3 players, clock radios, etc.) have become a popular choice for people looking for something simpler and smaller than a "boombox" or component-style stereo system It is to be appreciated that, as used herein, a component-style stereo system is one in which external speakers are used.

Some conventional table top audio devices have internal linear power supplies. The basic operating theory of a linear power supply is as follows: The incoming AC (alternating current) voltage is stepped down to a lower AC voltage (e.g., 120 Vac is stepped down to 24 Vac) using a 60 Hz transformer. The AC voltage is then rectified through a full-wave bridge rectifier, usually with a high-current, low-voltage bridge. A filter capacitor is used to maintain a constant dc level with minimum ripple. Linear power supplies offer the advantages of being well known, relatively noise-free and reasonably reliable. They are also generally easy to design and fairly inexpensive to manufacture. However, because of the large 60 Hz transformers required, linear power supplies are generally heavy and rather large. In addition, because a linear voltage regulator operates in its linear region, and all the output current must pass through it, large heat sinks are generally required to dissipate energy loss.

To avoid these disadvantages associated with linear power supplies, other conventional table top audio devices use external switching power supplies which are typically located on the power cord. These external power supplies are referred to as "in-line" power supplies and may include boxes at the plug end of a power cable that are typically referred to as "wall warts." Switching power supplies operate by rectifying and filtering the incoming AC voltage to obtain a high-voltage DC signal. A low-current, high-voltage bridge rectifier (that may not require a heat sink) can be used, as opposed to the linear bridge used in linear power supplies. The DC voltage is then converted to high frequency AC (typically about 10 kHz to 1 MHz) using electronic switches. The voltage of the high-frequency AC is converted using a high frequency transformer. A benefit of increasing the frequency of the AC signal is that higher frequencies require smaller transformers. At the output of the transformer, the AC is full-wave rectified to an output DC voltage. To keep output DC voltage constant, a sophisticated feedback controller, usually implemented as an integrated circuit chip, is used.

Although switching power supplies are generally smaller and lighter than equivalent linear power supplies, due to the ability to use a smaller transformer, they typically have higher production costs and the use of high frequency switching can result in undesirable noise radiated from the power supply and conducted on the inputs and outputs of the power supply. As a result of this radiated and conducted noise associated with switching power supplies, they typically can only be used as external power sources for audio devices. Of particular concern with the use of switching power supplies in table top radios is that higher frequency harmonics of the power supply switching frequency may generate noise on the signal received by the AM and FM receiver circuitry in the radios. This concern is even greater for radios that utilize the input power line as an antenna.

SUMMARY OF INVENTION

At least one embodiment described herein is directed to a small, self-contained audio device including an integrated switching power supply.

According to one embodiment, an integrated audio device comprises a housing, a speaker disposed within the housing, a switching power supply disposed within the housing, and audio circuitry disposed within the housing and coupled between the digital switching power supply and the speaker. In one example, the switching power supply is a digital switching power supply. In another example, the digital switching power supply comprises a switching controller and a transformer wound in accordance with a specification of the switching controller.

According to one aspect, the integrated audio device further comprises a filter circuit disposed within the housing and constructed and arranged to receive an AC input signal and to produce a filtered signal, and a bridge rectifier coupled to the filter circuit and configured to receive and rectify the filtered signal and to provide a DC signal to the switching power supply. In one example, the switching power supply comprises a transformer and a plurality of digital switches configured to generate an AC signal from the DC signal. In another example, the integrated audio device further comprises an input line which carries the AC input signal, the input line being configured as an FM antenna for the audio device. In another example, the filter circuit comprises a line filter. In one example, the line filter comprises a transformer. In another example, the filter circuit further comprises at least one inductor coupled between the line filter and the bridge rectifier. The filter circuit may further comprise at least one capacitor coupled between an output line of the filter circuit and ground.

According to another aspect, the integrated audio device further comprises an electromagnetic shield disposed within the housing. In one example, the electromagnetic shield comprises a faraday cage that encloses the switching power supply. In another example, the audio circuitry comprises a digital amplifier, and the electromagnetic shield comprises a first metal box substantially enclosing the switching power supply, and a second metal box substantially enclosing the digital amplifier. The first and second metal boxes are coupled to ground. In one example, the integrated audio device has a total internal volume of approximately 273 cubic inches. In another example, the integrated audio device is configured to generate approximately 100 Watts RMS output power.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
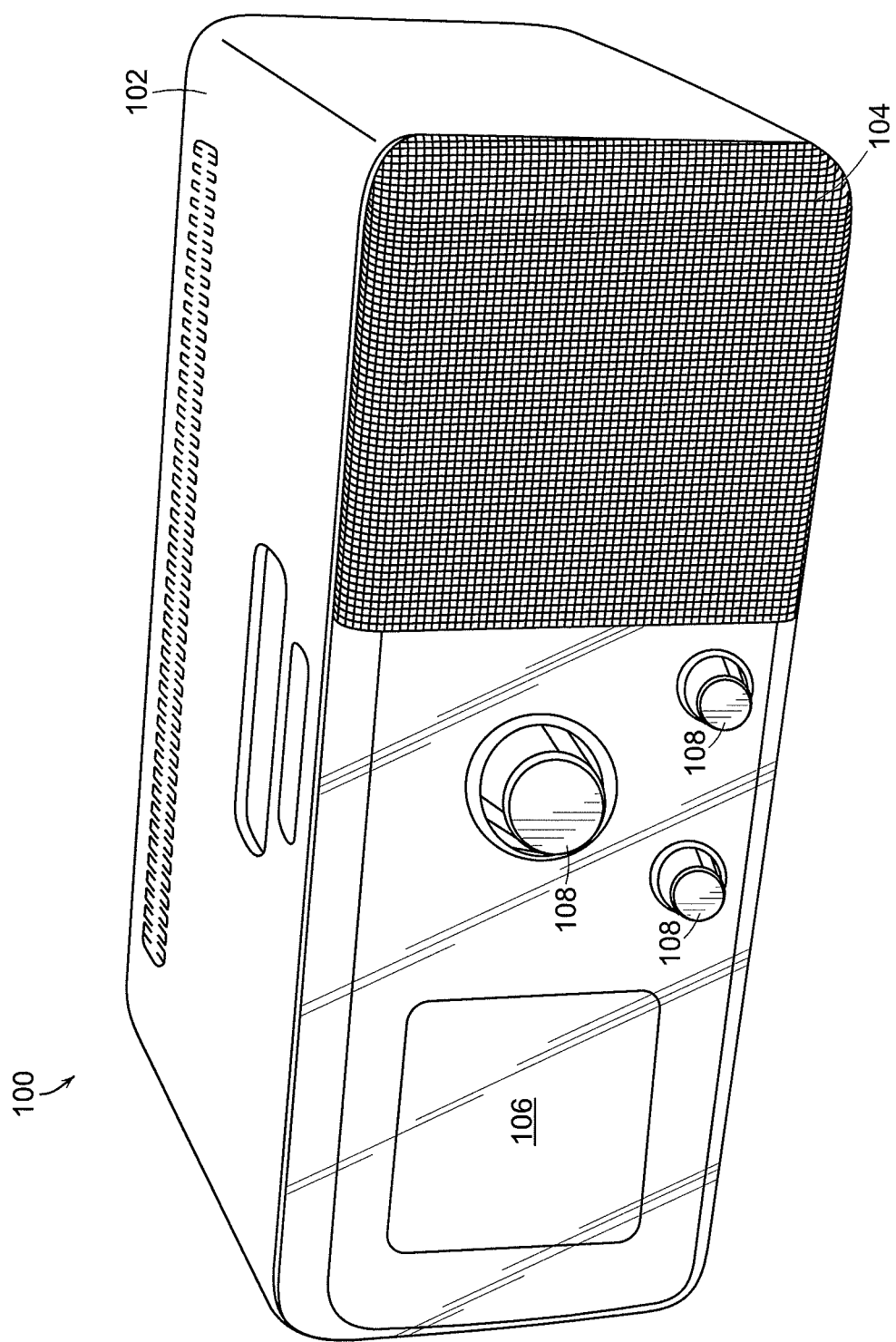
FIG. 1 is a diagram of one example of an audio device according to aspects of the invention.

As discussed above, conventional table top audio devices that have either linear power supplies or external power supplies suffer from disadvantages. Linear power supplies are generally fairly bulky and heavy, which is particularly undesirable for small, portable, table-top audio devices because the power supply increases the size and weight of the device. External power supplies provided on the power cord (in-line adaptors) are unsightly and inconvenient, and add to the bulk of the power cord. Accordingly, to overcome these and other disadvantages in conventional devices, aspects and embodiments are directed to an integrated solution which includes a full-featured self-contained entertainment audio device which has a very small footprint and contains an integral digital switching power supply. Benefits of using a digital switching power supply include that the power supply is highly efficient and converts most of the wall power into "usable power" by the audio device instead of heat. As discussed above, switching power supplies are smaller in size than a comparable linear power supply rated for a similar power consumption. Thus, by using a switching power supply it is possible to get more power out of a smaller sized footprint.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

According to one embodiment, a table top radio having an internal switching power supply is capable of providing 100 watts RMS of available output power to speakers, with the entire table top radio contained in an enclosure that measures 10.5 inches by 6.5 inches by 4 inches for a total internal volume of approximately 273 cubic inches. As discussed above, the typical drawback of using a digital switching power supply is that it tends to create a lot of digital noise (both radiated and conducted) which can interfere with sensitive electronics and, in particular, audio quality. As discussed below, embodiments of the present invention allow the use of a switching power supply while minimizing effects of the noise associated with the switching power supply.

At least some aspects and embodiments of table top radios described herein utilize a combination of electronics hardware-based noise filtering, electromagnetic interference (EMI) shielding, and off-the-shelf software noise filtering which collectively enable a high output power table top audio device to be contained in a small enclosure without the use of external, in-line switching power supplies.

Referring to FIG. 1, there is illustrated one example of a table top audio device according to aspects of the invention. In one embodiment, the audio device has a width (depth) of 6.5 inches, a height of 4 inches, and a length of 10.5 inches and produces 100 watts RMS of available output power. The audio device 100 includes a housing 102 inside which the power supply, amplifier, audio circuitry, radio receiving circuitry, etc. are contained. The audio device 100 comprises a speaker 104 and a display 106 that allows a user to see information about the audio being played (e.g., a radio station to which the device is tuned, the name of a song playing, the time, etc.). The audio device 100 also comprises control knobs 108 that allow the user to adjust the volume of the audio and to alter aspects of the audio, for example, to tune the device to a particular radio station or to adjust the tone (bass/treble) of the sound, or to select a different audio mode (e.g., to change the device from playing received radio to playing audio from a CD or attached MP3 player).

As discussed above, the audio device 100 comprises an integrated digital switching power supply located within the housing 102 along with the speaker 104 and other audio circuitry. In one embodiment, the switching power supply includes a switching controller (for example, the switching controller available from Power Integrations Inc. of San Jose, Calif. under part number TOP249Y) and a transformer wound according to the switching controller specifications. To address the problem of noise associated with locating a switching power supply near the audio circuitry and speakers, filtering is applied to the incoming AC signal and to the output signals supplied by the switching power supply.

Figure 2:
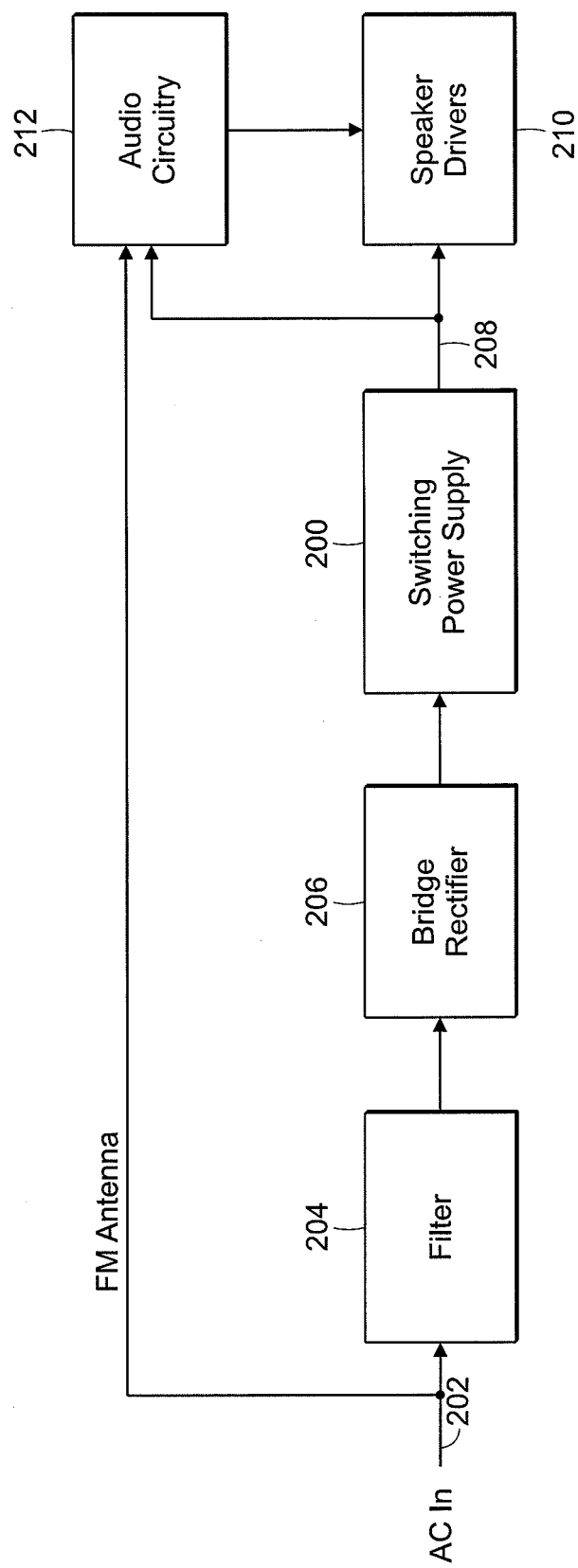
FIG. 2 is a block diagram of some components, including a power supply, of one example of an audio device, according to aspects of the invention.

Referring to FIG. 2, there is illustrated a block diagram of some components of the audio device 100, including the switching power supply 200. The incoming AC signal from the wall power ("mains") enters the audio device on the power cord, represented by line 202. The incoming AC signal is filtered by filtering circuitry 204 and provided to a bridge rectifier 206. The bridge rectifier 206 rectifies the AC voltage to obtain a high-voltage rectified signal. This high voltage rectified signal is provided to the switching power supply 200.

The switching power supply 200 comprises a transformer and digital electronic switches (e.g., transistors). The incoming rectified voltage from the bridge rectifier 206 is converted to high frequency AC using the digital switches. In one example, this high frequency signal has a frequency of about 132 kHz, which may reduce the size of the transformer/power supply. The high frequency AC signal is rectified to generate an output DC voltage that is supplied on line 208. It is to be appreciated that although only one output line 208 is illustrated, the invention is not so limited and the switching power supply 200 may generate more than one output DC voltage level. For example, the switching power supply 200 may generate positive and negative supply voltages (e.g., +25 Vdc and −25 Vdc), in which case the output line 208 would comprise at least two output lines. The switching power supply may also generate several different output DC voltages, for example, +25 Vdc, −25 Vdc and +10 Vdc. Thus, it is to be appreciated that line 208 represents as many output lines as required to support all the output DC voltage levels supplied by the switching power supply 200 in any given application.

Still referring to FIG. 2, the output DC voltages provided by the switching power supply are used to power the remaining circuitry of the audio device, including, for example, speaker driver circuitry 210 (e.g., speaker amplifiers and associated circuitry) audio circuitry 212 (e.g., radio tuning circuitry, control circuitry, display circuitry, etc.). To suppress noise conducted from the switching power supply 200 on the output line 208, one or more series inductors (not shown) may be connected in the line 208. In one example, the series inductor has a value of 2.2 micro-Henries (µH) with a current rating (l_sat) of 3.5 Amperes. For the embodiments in which line 208 comprises two or more individual lines (as discussed above), a series inductor may be connected in each output line.

In one embodiment, resistive dividers and/or other circuitry can be used to adjust the DC voltage level supplied by the switching power supply 200 to the level needed by specific circuitry. In another embodiment, additional switching power supplies may be provided "downstream" of the switching power supply 200 to provide additional DC voltage levels. The output voltages supplied by these additional switching power supplies may be filtered in a manner similar to that discussed with regard to the output voltage(s) from the switching power supply 200. For example, series inductors in the output line(s) may be used to suppress output conducted noise, as discussed above.

Figure 3:
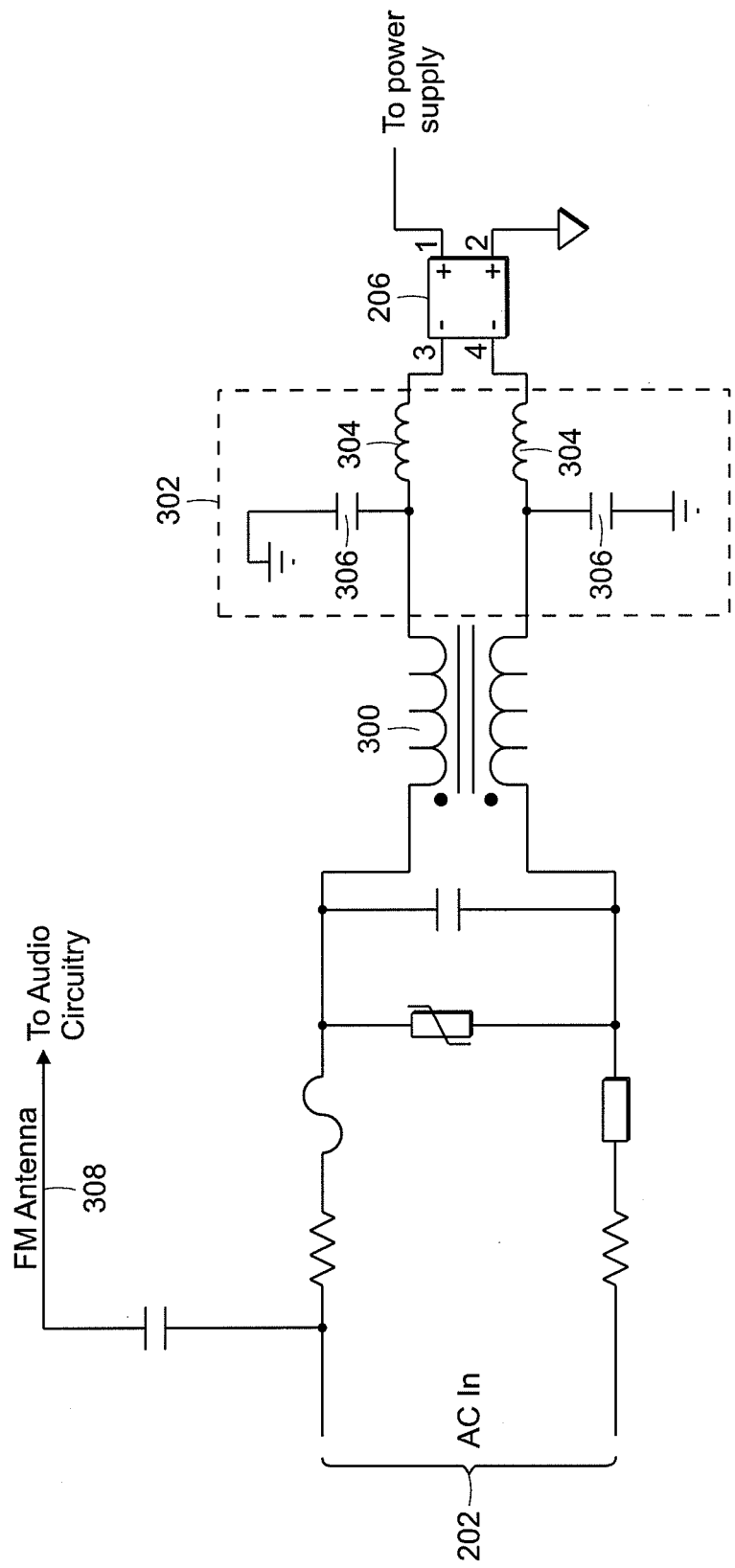
FIG. 3 is a more detailed illustration of some of the components of FIG. 2.

Referring to FIG. 3, there is illustrated one example of the filtering circuitry 204. According to one embodiment, the AC input line (i.e., the power cord for the audio device) is used as the FM radio antenna for the audio device. As shown in FIG. 3, the AC input line 202 is coupled to an FM antenna port 308 that is coupled to FM receiver circuitry that is, in turn, coupled to the audio circuitry. In this embodiment it is particularly important to prevent noise from the switching power supply from leaking onto the AC line as such noise would degrade the radio reception. Therefore, filtering circuitry 204 is used to suppress noise. In the example illustrated in FIG. 3, the filtering circuitry 204 includes a line filter 300 and additional filter circuitry 302. In one example, the line filter 300 comprises a transformer to prevent noise from the switching power supply from leaking onto the AC input line. The filter circuitry 302 comprises inductors 304 connected in series between the line filter 300 and the bridge rectifier 206. The filter circuitry 302 also comprises capacitors 306 connected between the output lines of the line filter 300 and ground, as shown in FIG. 3. The combination of the inductors 304 and capacitors 306 acts to prevent switching noise from switching power supply from getting onto the AC input line 202. In one example, the values of the inductors 304 and capacitors 306 may be selected through an iterative process. This process may include, for example, sweeping a test signal through the power supply and monitoring the noise on the AC input line 202 for different values of the inductors 304 and capacitors 306, so as to select optimum values of the inductors and capacitors for a given application (e.g., a given switching frequency and/or power rating of the switching power supply). For example, in one embodiment, the inductors 304 have a value of 2.2 µH and a current rating of 3.5 Amperes, and the capacitors 306 have a capacitance value of 1000 picofarads (pF).

According to another embodiment, to suppress radiated electromagnetic interference from the power supply, an electromagnetic shield may be incorporated within the housing 102. This electromagnetic shield may be, for example, a faraday cage that at least partially surrounds circuit components of the audio device 100 that generate radiated noise, such as, for example, a digital amplifier used to drive the speakers and the switching power supply. In one example, the electromagnetic shield includes two or more metal boxes incorporated within the housing 102 and coupled to a printed circuit board that carries the circuitry of the audio device. One metal box surrounds the switching power supply and another surrounds the digital amplifier. The shield may be grounded through the printed circuit board and the AC input line.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:
1. An integrated audio device comprising:
a housing;
a speaker disposed within the housing;
a switching power supply disposed within the housing;
audio circuitry disposed within the housing and coupled between the switching power supply and the speaker;
a filter circuit disposed within the housing and constructed and arranged to receive an AC input power signal for the audio device and to produce a filtered signal; and an input power line that carries the AC input power signal, the input power line configured as an FM antenna for the audio device.

2. The integrated audio device of claim 1, wherein the switching power supply is a digital switching power supply.

3. The integrated audio device of claim 2, wherein the digital switching power supply comprises a switching controller and a transformer wound in accordance with a specification of the switching controller.

4. The integrated audio device of claim 1, further comprising:
a bridge rectifier coupled to the filter circuit and configured to receive and rectify the filtered signal and to provide a DC signal to the switching power supply.

5. The integrated audio device of claim 4, wherein the switching power supply comprises a transformer and a plurality of digital switches configured to generate an AC signal from the DC signal.

6. The integrated audio device of claim 4, wherein the filter circuit comprises a line filter.

7. The integrated audio device of claim 6, wherein the line filter comprises a transformer.

8. The integrated audio device of claim 6, wherein the filter circuit further comprises at least one inductor coupled between the line filter and the bridge rectifier.

9. The integrated audio device of claim 8, wherein the filter circuit further comprises at least one capacitor coupled between an output line of the filter circuit and ground.

10. The integrated audio device of claim 1, further comprising an electromagnetic shield disposed within the housing.

11. The integrated audio device of claim 10, wherein the electromagnetic shield comprises a faraday cage that encloses the switching power supply.

12. The integrated audio device of claim 10, wherein the audio circuitry comprises a digital amplifier, and wherein the electromagnetic shield comprises:
a first metal box substantially enclosing the switching power supply; and
a second metal box substantially enclosing the digital amplifier;
wherein the first and second metal boxes are coupled to ground.

13. The integrated audio device of claim 1, wherein the integrated audio device has a total internal volume of approximately 273 cubic inches.

14. The integrated audio device of claim 1, wherein the integrated audio device is configured to generate approximately 100 Watts RMS output power.

15. The integrated audio device of claim 1, wherein the integrated audio device is a table-top radio.

16. The integrated audio device of claim 1, further comprising an FM receiver circuit coupled to the input power line.

* * * * *